(12) United States Patent
Kim et al.

(10) Patent No.: US 7,513,191 B2
(45) Date of Patent: Apr. 7, 2009

(54) PISTON HEAD FOR HYDRAULIC INJECTION MOLDING MACHINE

(75) Inventors: Jeong-Ho Kim, Gyeonggi-do (KR); Joon-Keun Lee, Seoul (KR); Young-Ju Kang, Seoul (KR)

(73) Assignee: LS Mtron Ltd., Anyang (KR)

( * ) Notice: Subject to any disclaimer, the term of this patent is extended or adjusted under 35 U.S.C. 154(b) by 132 days.

(21) Appl. No.: 11/651,373

(22) Filed: Jan. 8, 2007

(65) Prior Publication Data
US 2007/0175325 A1    Aug. 2, 2007

(30) Foreign Application Priority Data
Jan. 10, 2006    (KR) ............... 10-2006-0002616

(51) Int. Cl.
*F16J 1/12*    (2006.01)

(52) U.S. Cl. .......................................... 92/179; 92/255
(58) Field of Classification Search .................. 92/172, 92/179, 255
See application file for complete search history.

(56) References Cited

U.S. PATENT DOCUMENTS 3,177,782 A * 4/1965 Sampson ................. 92/255

* cited by examiner

*Primary Examiner*—Michael Leslie
(74) *Attorney, Agent, or Firm*—Jones Day

(57) ABSTRACT

A piston head of a hydraulic injection molding machine is screwed with a tie rod inside a hydraulic cylinder of the hydraulic injection molding machine. The piston head has a second screw formed in an inner circumference of a hollow of the piston head and engaged with a first screw formed in an outer circumference of the tie rod. An insert groove having a predetermined shape is formed in the inner circumference of the piston head in front of the second screw.

3 Claims, 5 Drawing Sheets

PISTON HEAD FOR HYDRAULIC INJECTION MOLDING MACHINE

BACKGROUND OF THE INVENTION

1. Field of the Invention

The present invention relates to a piston head of a hydraulic injection molding machine, and more particularly to a piston head of a hydraulic injection molding machine capable of reducing a maximum stress applied to a tie rod screwed with the piston head.

2. Description of the Related Art

Generally, an injection molding machine includes an injection device and a clamping device. The injection device melts a resin and injects the melted resin into a mold under high pressure. The clamping device opens/closes the mold and applies a clamping force for combining the mold not to be opened by the high pressure melted resin injected to the mold. This injection molding machine is disclosed in Korean Laid-open Patent Publication No. 10-2005-0097366.

The clamping force is generated from a hydraulic cylinder. As shown in FIG. 1, a hydraulic pressure is applied to a piston head 10 screwed with a tie rod 20 inside a hydraulic cylinder (not shown) to generate a clamping force. That is, a hydraulic pressure is acted to the piston head 10 and a fixed template (not shown) at an opposite side of the piston head 10 at the same time to generate a clamping force. The hydraulic pressure applied to the piston head 10 is transferred to the tie rod 20.

While the hydraulic pressure is transferred as mentioned above, a stress is concentrated on a first screw 22 of the tie rod 20. That is to say, a load caused by the hydraulic pressure is not uniformly applied to the first screw 22 but a maximum stress is applied to a first root 23 of the first screw 22. It is because the hydraulic pressure is directly acted on the first screw 22 as a compressing stress while being transferred alone an arrow 30 from the piston head 10. Reference numeral 12 designates a second screw formed on the piston head 10.

A stress distribution on the first screw 22 is shown in FIG. 6. In FIG. 6, the term 'root number' indicates the sequence of roots from a right side of the first screw 22 formed on the tie rod 20.

Meanwhile, since the load applied to the first screw 22 is repeated, a fatigue limit of material is also considered for preventing a fatigue failure together with a tensile strength and a safety factor when determining dimensions of the tie rod 20.

Since dimensions of the tie rod 20 should be determined based on a maximum stress, as the maximum stress is increased, the tie rod 20 should have a greater diameter and a preform used for making the tie rod 20 should have a greater size.

In order to solve the above problem, as shown in FIG. 2, a piston head 10a having a stress relieving groove 14a has been proposed. The stress relieving groove 14a is formed along a circumference of the tie rod 20 in front of the piston head 10a. Such a stress relieving groove 14a is disclosed in U.S. Pat. No. 4,571,135 and so on.

However, if the piston head 10a is used in a place where a hydraulic pressure is applied, the hydraulic pressure is also applied to the stress relieving groove 14a. by which effects such as maximum stress reduction or stress regularization cannot be expected. According to numerical analysis results, a stress on a first root 23 of the tie rod 20, namely a maximum stress, is increased about 5%, and a minimum stress among stresses applied to second and later roots is decreased, thereby increasing irregularity of stress.

If a maximum stress is decreased by means of regularization of stresses applied to the first screw 22, it would be possible to enhance a safety factor, lower possibility of fatigue failures, decrease a diameter of the tie rod 20 and reduce material costs and production costs for making the tie rod 20.

SUMMARY OF THE INVENTION

The present invention is designed to solve the problems of the prior art, and therefore it is an object of the present invention to provide a piston head of a hydraulic injection molding machine, which may reduce a maximum stress applied to a screw of a tie rod.

In order to accomplish the above object, the present invention provides a piston head of a hydraulic injection molding machine, which is screwed with a tie rod inside a hydraulic cylinder of the hydraulic injection molding machine, wherein the piston head has a second screw formed in an inner circumference of a hollow of the piston head and engaged with a first screw formed in an outer circumference of the tie rod, and an insert groove having a predetermined shape is formed in the inner circumference of the piston head in front of the second screw.

Preferably, the insert groove is formed in a circumferential direction of the inner circumference.

In addition, the insert groove is preferably formed between the second screw and an oil sealing unit that prevents inflow of oil.

Here, the insert groove is preferably formed to be inclined toward the rear of the piston head.

In addition, the insert groove may be formed to be perpendicular to the inner circumference.

As an alternative, the insert groove may be formed to a predetermined depth perpendicularly to the inner circumference and then bent toward the rear of the piston head.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 3:
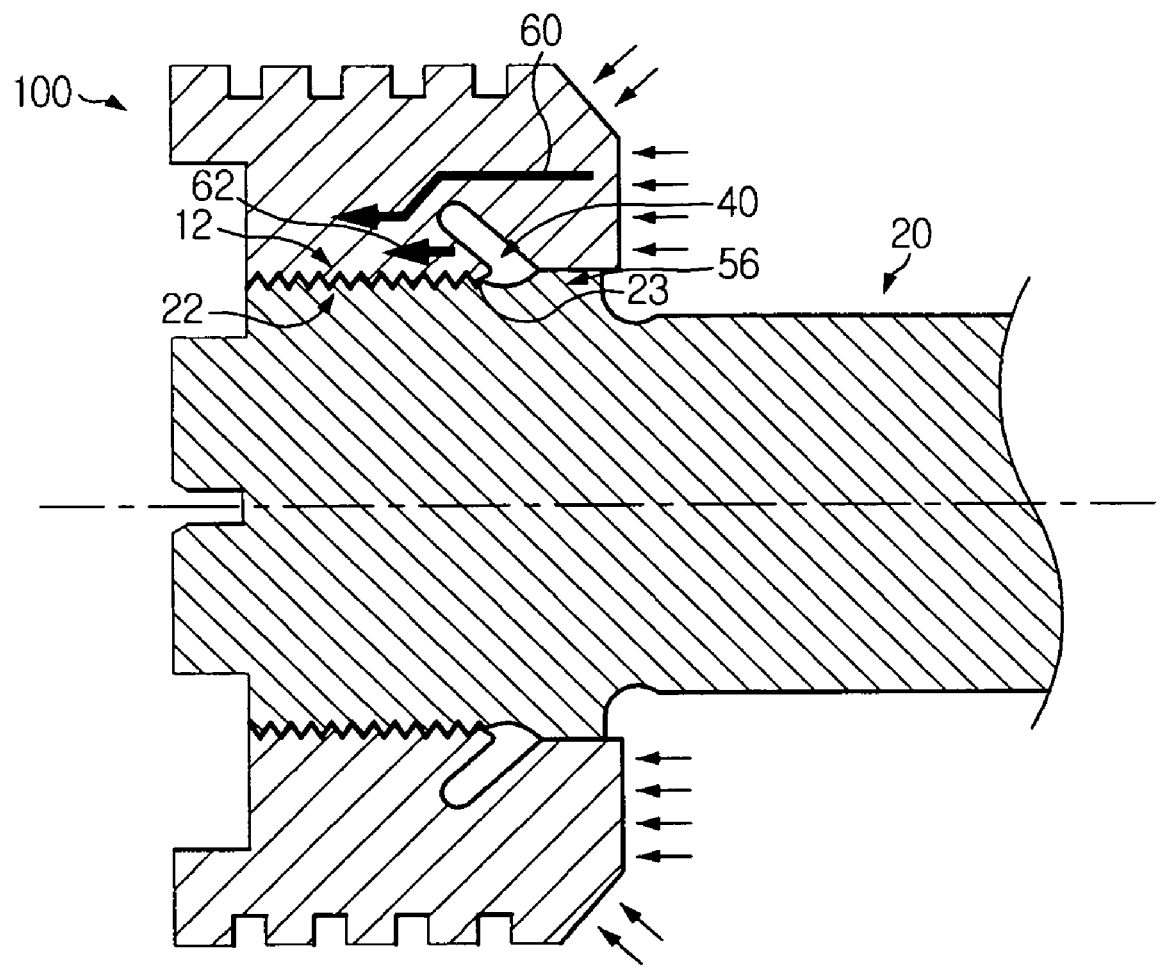
FIG. 3 is a sectional view showing a piston head coupled with a tie rod according to a first embodiment of the present invention.

FIG. 3 is a sectional view showing a piston head coupled with a tie rod according to a first embodiment of the present invention.

Referring to FIG. 3, the piston head 100 has an insert groove 40 formed with a slope. The piston head 100 is screwed with a tie rod 20. A first screw 22 is formed on an outer circumference of the tie rod 20, and a second screw 12 engaged with the first screw 22 is formed in an inner circumference of a hollow of the piston head 100. The tie rod 20 is screwed into the hollow of the piston head 100.

The insert groove 40 is formed to be inclined toward the rear of the piston head 20. The insert groove 40 is formed in front of the second screw 12, and preferably formed between the second screw 12 and an oil sealing unit 56 for preventing inflow of oil. It allows to effectively reduce a maximum stress generated at a first root 23 of the first screw 22.

In addition, the insert groove 40 is preferably formed in a circumferential direction of the inner circumference.

Figure 6:
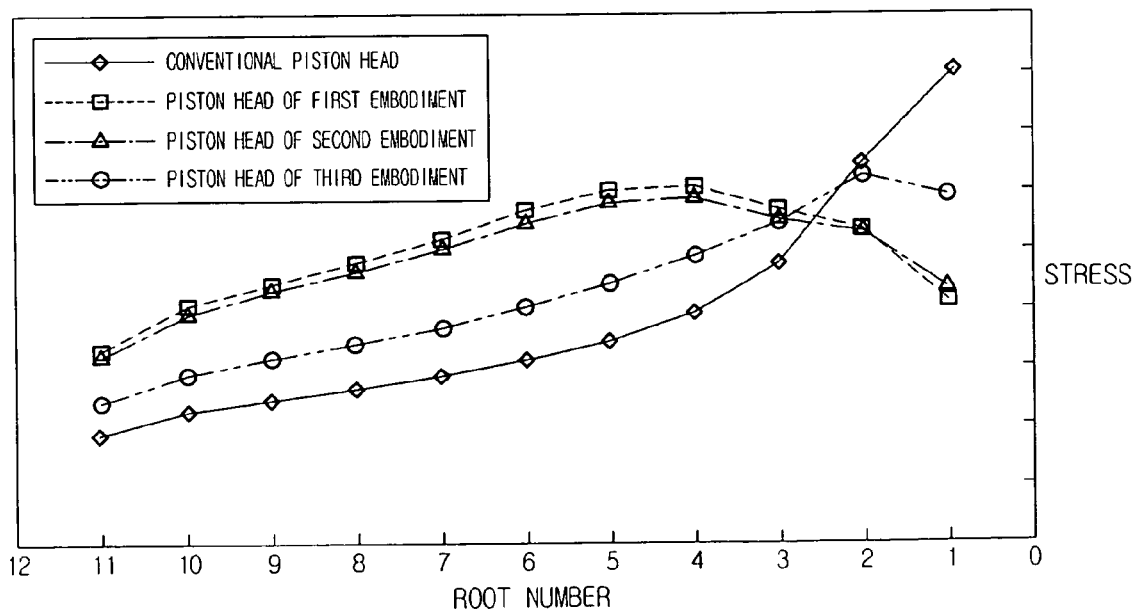
FIG. 6 shows a stress distribution applied to the conventional tie rod of FIG. 1 and to the tie rods of FIGS. 3 to 5 according to the present invention.

If the insert groove 40 is formed in the piston head 100 as mentioned above, it is possible to change a path along which a hydraulic pressure is transferred. The insert groove 40 makes a hydraulic pressure be transferred through an outer portion of the piston head 100. That is to say, due to the insert groove 40, a stress caused by the hydraulic pressure is transferred with detouring around the insert groove 40, as indicated by an arrow 60. If the hydraulic pressure is transferred with detouring around the insert groove 40, the stress caused by the hydraulic pressure acts as a tensile force at the first root 23, thereby decreasing a maximum stress, and thus an entire stress distribution on the first screw 22 becomes more regular. The stress distribution on the first screw 22 is shown in FIG. 6.

Figure 4:
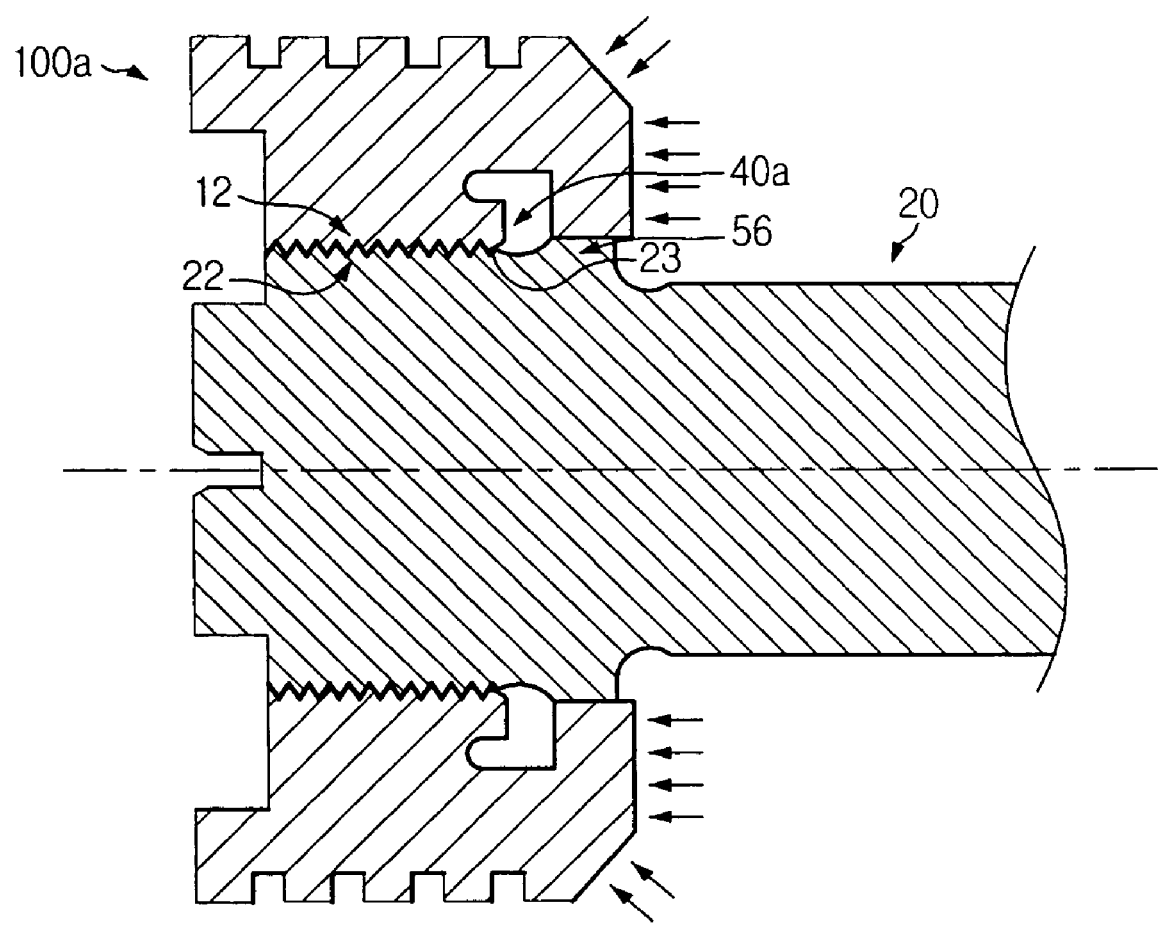
FIG. 4 is a sectional view showing a piston head coupled with a tie rod according to a second embodiment of the present invention.

FIG. 4 is a sectional view showing a piston head screwed with a tie rod according to a second embodiment of the present invention. The piston head 100a has an insert groove 40a formed to a predetermined depth perpendicularly to an inner circumference of a hollow of the piston head 100a and then bent backward. Preferably, the insert groove 40a has a section in a 'L' shape.

Figure 5:
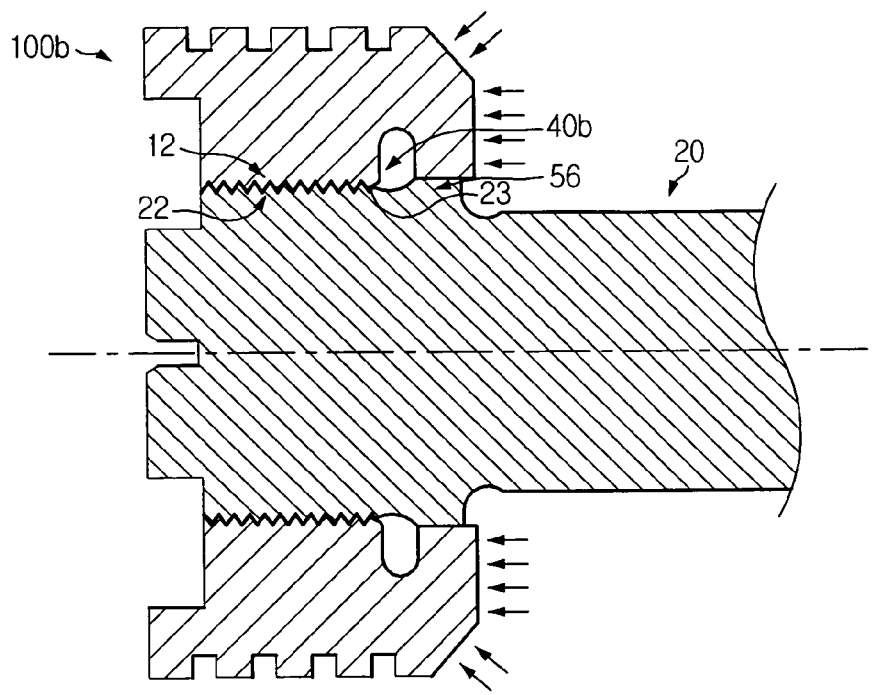
FIG. 5 is a sectional view showing a piston head coupled with a tie rod according to a third embodiment of the present invention.

FIG. 5 is a sectional view showing a piston head screwed with a tie rod according to a third embodiment of the present invention. This piston head 100b has an insert groove 40b formed to be perpendicular to an inner circumference of a hollow of the piston head. Meanwhile, in FIGS. 4 and 5, the same reference numeral as in FIG. 3 designates the same component having the same function.

The insert groove 40a, 40b is formed in front of the second screw 12, and preferably formed between the second screw 12 and the oil sealing unit 56 that prevents inflow of oil. In addition, the insert groove 40a, 40b is preferably formed in a circumference direction of the inner circumference. A stress distribution on the first screw 22 is shown in FIG. 6.

Figure 1:
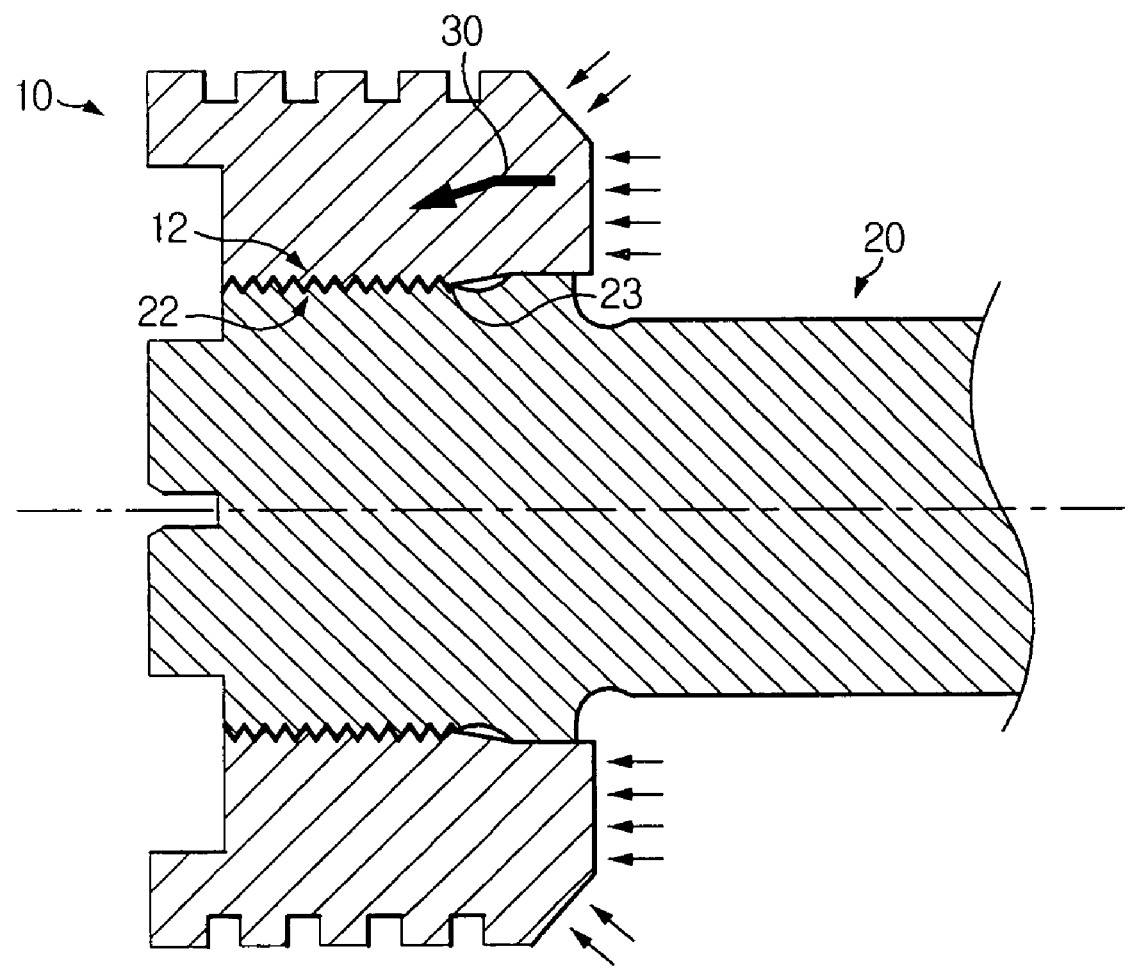
FIGS. 1 and 2 are sectional views showing a conventional piston head coupled with a tie rod, respectively.
Figure 2:
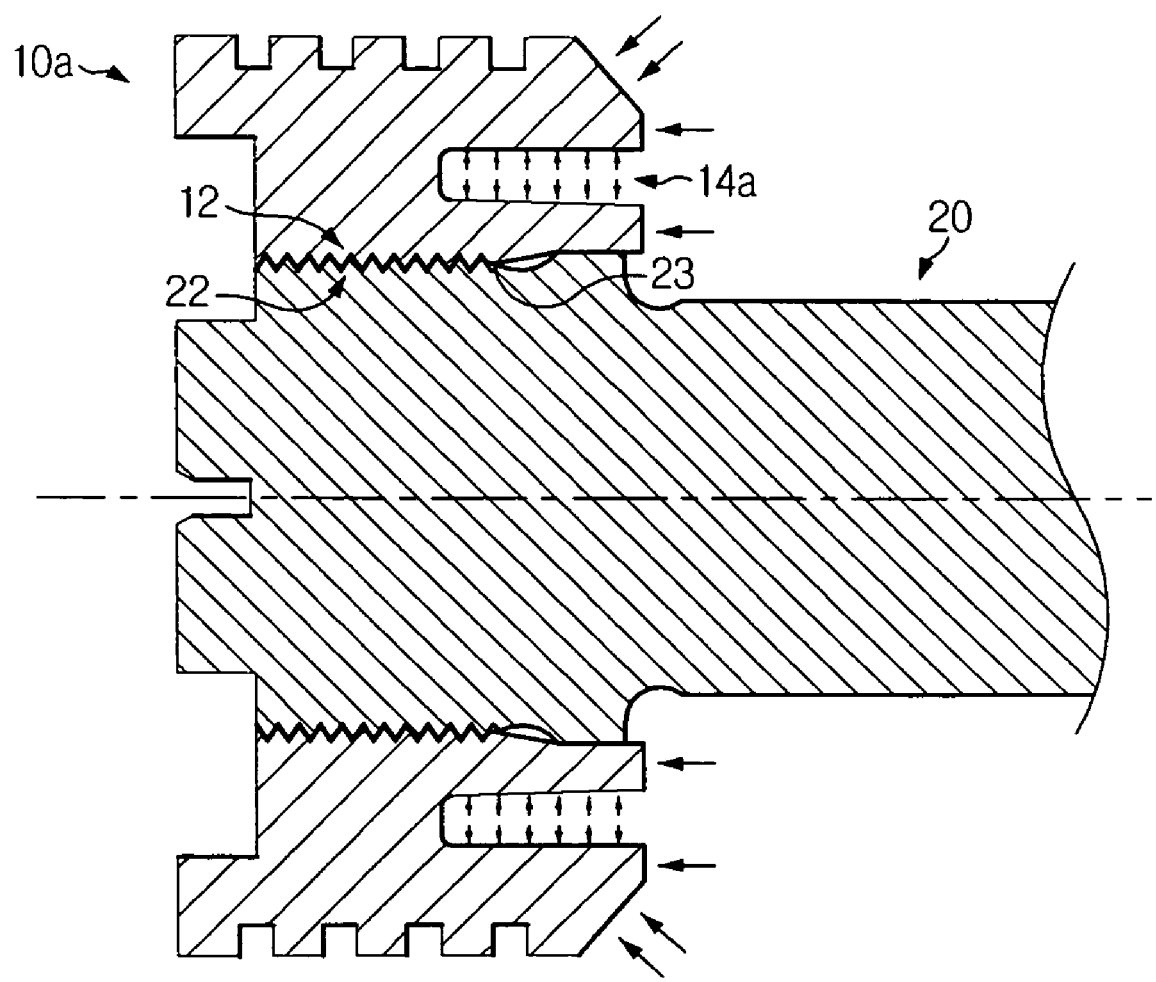

As mentioned above, the insert groove 40, 40a, 40b formed in the piston head 100, 100a, 100b decreases a maximum stress applied to the first screw 22. As shown in FIG. 6, a maximum stress occurs at the first root 23 in case of a general piston head 10 (see FIG. 1) having no insert groove 40, 40a, 40b, but a maximum stress occurs at a second or later root in case of the piston head 100, 100a, 100b having the insert groove 40, 40a, 40b and this maximum stress is smaller than that of a general piston head 10. It is because the hydraulic pressure is transferred with detouring around the insert groove 40, 40a, 40b.

Assuming that a maximum stress generated in a general piston head 10 is 1, a relatively maximum stress occurring in each piston head 100. 100a, 100b of the present invention and its reduction ratio are listed in the following table 1.

TABLE 1

| | Ratio of Maximum Stress | Stress Reduction Ratio |
| --- | --- | --- |
| General Piston Head (10) | 1.00 | — |
| Piston Head (100) of First Embodiment | 0.75 | −25% |
| Piston Head (100a) of Second Embodiment | 0.73 | −27% |
| Piston Head (100b) of Third Embodiment | 0.81 | −19% |

As shown in the table 1, it would be understood that a maximum stress is decreased when using the piston head 100, 100a, 100b of the present invention.

APPLICABILITY TO THE INDUSTRY

As described above, the piston head of a hydraulic injection molding machine according to the present invention gives the following effects.

First, it is possible to reduce concentration of stress applied to a screw of the tie rod and the piston head.

Second, it is possible to enhance a safety factor and lower possibility of fatigue failures by reducing the maximum stress applied to the screw of the tie rod and the piston head.

Third, it is possible to reduce material costs and production costs since a diameter of a preform used for making the tie rod may be decreased.

What is claimed is:

1. A piston head of a hydraulic injection molding machine, which is screwed with a tie rod inside a hydraulic cylinder of the hydraulic injection molding machine, wherein the piston head has a second screw formed in an inner circumference of a hollow of the piston head and engaged with a first screw formed in an outer circumference of the tie rod, and an insert groove having a predetermined shape is formed in the inner circumference of the piston head in front of the second screw, wherein the insert groove is formed in a circumferential direction of the inner circumference, and wherein the insert groove is formed between the second screw and an oil sealing unit that prevents inflow of oil.

2. A piston head of a hydraulic injection molding machine, which is screwed with a tie rod inside a hydraulic cylinder of the hydraulic injection molding machine, wherein the piston head has a second screw formed in an inner circumference of a hollow of the piston head and engaged with a first screw formed in an outer circumference of the tie rod, and an insert groove having a predetermined shape is formed in the inner circumference of the piston head in front of the second screw, wherein the insert groove is formed to be inclined toward the rear of the piston head.

3. A piston head of a hydraulic injection molding machine, which is screwed with a tie rod inside a hydraulic cylinder of the hydraulic injection molding machine, wherein the piston head has a second screw formed in an inner circumference of a hollow of the piston head and engaged with a first screw formed in an outer circumference of the tie rod, and an insert groove having a predetermined shape is formed in the inner circumference of the piston head in front of the second screw, wherein the insert groove is formed to a predetermined depth perpendicularly to the inner circumference and then bent toward the rear of the piston head.

* * * * *